Feb. 6, 1940.   G. G. HARRINGTON   2,189,031
REAMER
Original Filed Nov. 14, 1938
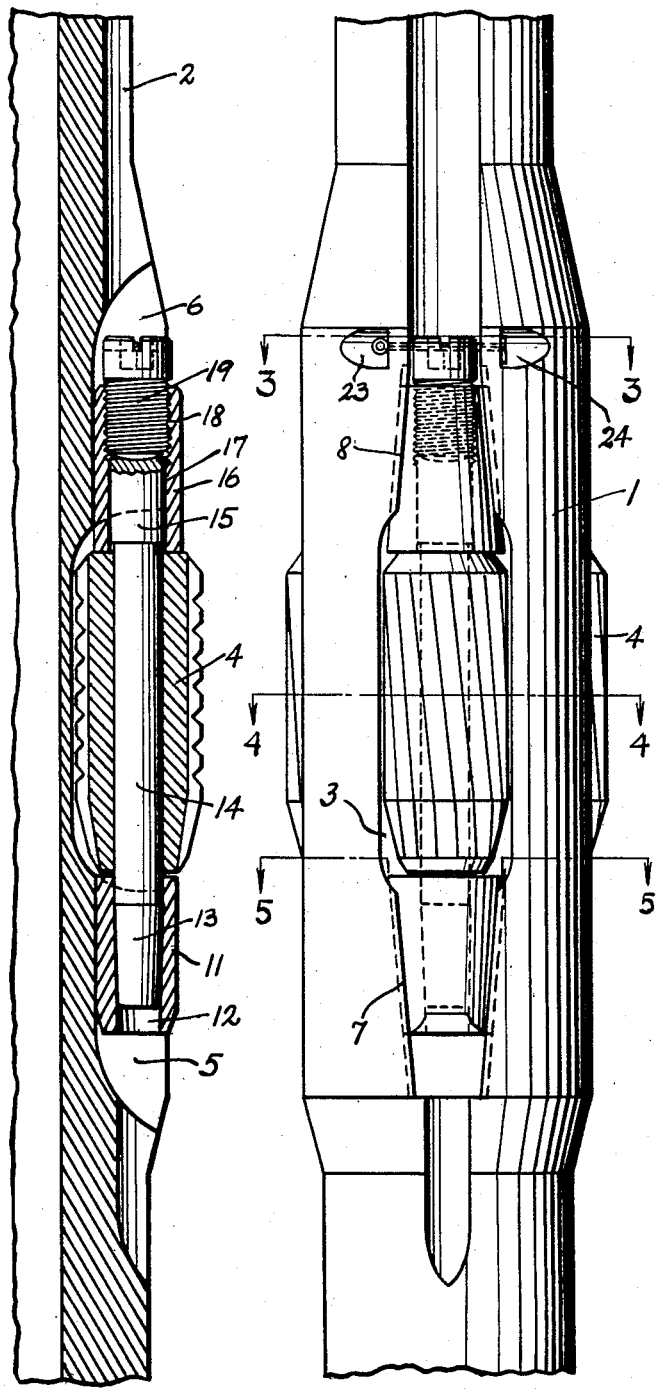
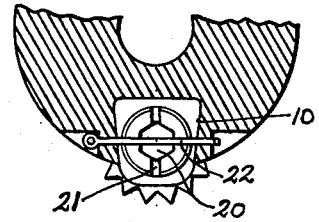
Fig.3.
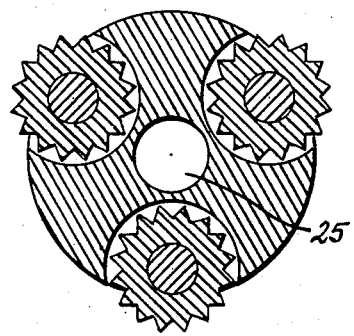
Fig.4.
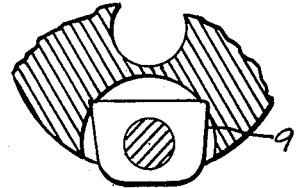
Fig.5.
G. G. Harrington,
Inventor Patented Feb. 6, 1940

2,189,031

UNITED STATES PATENT OFFICE 2,189,031

REAMER

George G. Harrington, Houston, Tex., assignor to Reed Roller Bit Company, Houston, Tex., a corporation of Texas Application November 14, 1938, Serial No. 240,400
Renewed August 9, 1939

8 Claims. (Cl. 255—73)

This invention relates to reamers for use in connection with the drilling of wells and the like. It has for its general object provision of a structure whereby a reamer cutter of the roller type may be firmly and rigidly mounted within a cutter recess in a reamer body.

In mounting reamer cutters within their recesses it is desirable that they be mounted as firmly as possible and it is desirable that there be no possibility of play between any of the parts constituting the mounting during the operation of the reamer.

It is therefore an object of this invention to provide a structure for mounting a reamer cutter in a recess in the side of the reamer body in such a manner as to give the greatest possible degree of rigidity to the mounting, prevent any play or lost motion between the parts of the mounting during operation, and at the same time utilize the smallest possible number of parts and eliminate any parts which might easily be broken or distorted.

It is a further object to provide a structure in which the parts are not welded or similarly joined together and in which no welding is employed on the reamer body.

Other objects and advantages will become apparent from the following description taken in connection with the accompanying drawing, it being understood that the same are by way of illustration and example only.

In the drawing:

Fig. 1 is a side elevation of a reamer body constructed in accordance with this invention showing the reamer cutters in place therein.

Fig. 2 is a vertical cross section through one wall of the reamer body illustrated in Fig. 1 and through one of the cutters mounted therein.

Fig. 3 is a partial horizontal cross section taken along the line 3—3 of Fig. 1.

Fig. 4 is a horizontal cross section taken along the line 4—4 of Fig. 1.

Fig. 5 is a partial horizontal cross section taken along the line 5—5 of Fig. 1.

In accordance with this invention, a reamer body 1 is formed with a longitudinal groove 2 at each of a number of spaced points where it is desired to mount a reamer cutter. At such points, the body is provided with major recesses 3 each adapted to receive a cutter 4 which may be of conventional or any other design. At each end of the major recess there is formed a minor recess, the lower of these being designated 5 and the upper 6. Each of these three recesses is in alignment with the corresponding groove 2 in the reamer body.

Each of the recesses 5 and 6 is formed with a double taper. The recess 5 tapers downwardly toward the lower end of the drill stem as indicated at 7, while the recess 6 tapers upwardly away from the major recess 3 toward the upper end of the drill stem as indicated at 8. Both of these recesses 5 and 6 also taper in a transverse direction, each being narrower at the outer surface of the body 1 than at a point remote from the said surface in any particular horizontal plane. This is clearly designated by the numerals 9 and 10 respectively in Figs. 5 and 3.

Fitted into the lower minor recess 5 is a block 11 which has a double exterior taper corresponding to the double taper of the recess and which is provided with a frusto-conical tapered opening therein. This tapered opening 12 extends from the upper end of this block 11 when the same is in place in the recess 5 and receives the tapered lower end 13 of the pin 14 on which the cutter 4 is rotatably mounted.

The upper end of the pin 14 is of slightly larger diameter as at 15 and is received within a block 16 provided with an external double taper corresponding to the double taper of the recess 6 and fitted in said recess. This block is provided with an opening therethrough, the lower portion of which, as previously stated, receives the upper end of the pin 14 and for this purpose may be of a smooth bore as at 17. The upper portion of this opening is threaded as at 18 to receive a set screw or compression screw 19. This screw 19 is provided with a hexagonal socket 20 adapted to receive a wrench for tightening it in place and with radial slots 21 angularly spaced about its head for the purpose of receiving a cotter key 22. This cotter key 22 extends from a small recess 23 through an opening, into the recess 6, passing through certain of the notches 21 in the head of the screw 19, and thence through another portion of the body member 1 into a second small recess 24. It will be seen that this will positively prevent the set screw from being turned once this cotter key is in place.

The reamer body is, of course, provided with the usual slush passageway 25 centrally thereof.

It will be understood that although a reamer is disclosed in which three cutters are employed, the same being spaced equally about the reamer body, any number of cutters desired can be employed within the limits of the size of the reamer body.

In assembling the reamer just described, the lower double tapered block 11 is first slipped into place within the lower recess 5 and the upper double tapered block 16 is slipped into place within the upper recess 6. The cutter 4 is then inserted into the major recess between the blocks 11 and 16 and held in alignment with these blocks. The pin 14 is then placed within the groove 2 about the recess 6 and passed downwardly through the block 16 and the cutter 4 and its lower tapered end 13 is fitted within the opening in the block 11. With the parts thus positioned, the set screw 19 is inserted into place and tightened within the block 16. The tightening of this set screw causes it to bear against the upper end of the pin 14 and thus forces this pin downwardly into the block 11. The pin 14 will wedge tightly into the block 11 and will move the block 11 downwardly to cause it to be wedged tightly within the recess 5 against longitudinal radial and circumferential movement. At the same time the reaction of the set screw 19 through its threaded connection with the block 16 will force this block upwardly and cause it to wedge tightly within the recess 6. This wedging action likewise will be such as to prevent any play of the block 16 in either a longitudinal, radial or circumferential direction.

After the set screw 19 has been firmly tightened, it may be secured in place as hereinbefore described by the insertion of a cotter key 22 in the manner illustrated in Figs. 1 and 3.

It will be seen from the description just given that by the structure set forth it will be possible to firmly secure in place within a recess in a reamer body a pin adapted to serve as an axle for a reamer cutter. This pin will be firmly secured at its lower end against any possibility of play by virtue of the double wedging engagement between the block 11 and the recess 5 and between the tapered end 13 of the pin 14 and the tapered opening 12 in the block 11. At the same time, the upper end of the pin 14 will be firmly held in position without possibility of play in any direction by virtue of the similar double wedging engagement between the block 16 and the recess 6 and by the firm engagement of the ball shaped or similar end on the screw 19 with the concave end of the pin 14 and the snug fit between the lower portion of the opening through the block 16 and the upper enlarged end 15 of the pin 14. It will be further seen that the tighter the set screw 19 is tightened, the more secure and the less susceptible of any movement whatever will be the engagement between the various parts referred to.

It will also be noted that a minimum number of parts has been employed and that they are relatively simple and can be readily and cheaply manufactured. Also, the device is susceptible of being readily dismounted for replacement and repair without in any way damaging any of the parts with the possible exception of the cotter key 22 so that they cannot be again used.

The construction will be found to be rugged and to stand up under hard usage over a long period of time. It is also easily and quickly assembled and disassembled without necessity for the use of skilled labor. All that is required is sufficient strength to apply the proper force to tighten or loosen the screw 19.

Having described my invention, I claim:

1. In a reamer construction, a reamer body having a main recess in its outer surface and a smaller auxiliary recess at each end of said main recess, each of said auxiliary recesses tapering toward a smaller dimension in a direction away from said main recess and in a direction outwardly from the center of said reamer body, a correspondingly tapered block in one of said auxiliary recesses having a seat formed therein adjacent said main recess, a reamer pin seated in said seat and extending through said main recess, a reamer cutter rotatably carried by said pin within said main recess, a second block tapered to fit the other of said auxiliary recesses and having an opening therethrough, the end of said pin opposite said first block being disposed within said opening, and means threaded into said opening for exerting a force on said pin toward said first block and a reactionary force on said second block tending to force both blocks tightly into said auxiliary recesses, and means for locking said threaded means in position.

2. In a reamer construction, a reamer body having a main recess in its outer surface and a smaller auxiliary recess at each end of said main recess, each of said auxiliary recesses tapering toward a smaller dimension in a direction away from said main recess and in a direction outwardly from the center of said reamer body, a correspondingly tapered block in one of said auxiliary recesses having a seat formed therein adjacent said main recess, a reamer pin seated in said seat and extending through said main recess, a reamer cutter rotatably carried by said pin within said main recess, a second block tapered to fit the other of said auxiliary recesses and having an opening therethrough, the end of said pin opposite said first block being disposed within said opening, and means threaded into said opening for exerting a force on said pin toward said first block and a reactionary force on said second block tending to force both blocks tightly into said auxiliary recesses.

3. In a reamer construction, a reamer body having a main recess in its outer surface and a smaller auxiliary recess at each end of said main recess, each of said auxiliary recesses tapering toward a smaller dimension in a direction away from said main recess and in a direction outwardly from the center of said reamer body, a correspondingly tapered block in one of said auxiliary recesses having a seat formed therein adjacent said main recess, a reamer pin seated in said seat and extending through said main recess, a reamer cutter rotatably carried by said pin within said main recess, a second block tapered to fit the other of said auxiliary recesses and having an opening therethrough, the end of said pin opposite said first block being disposed within said opening, and means for exerting a force on said pin toward said first block and a reactionary force on said second block tending to force both blocks tightly into said auxiliary recesses.

4. In a reamer construction, a reamer body having a main recess in its outer surface and a smaller auxiliary recess at each end of said main recess, each of said auxiliary recesses tapering toward a smaller dimension in a direction away from said main recess and in a direction outwardly from the center of said reamer body, a correspondingly tapered block in each of said auxiliary recesses, a reamer pin having its ends carried by said blocks respectively, and extending through said main recess, a reamer cutter rotatably carried by said pin within said main recess, and means for exerting a force on said pin toward one of said blocks and a reactionary force on the other of said blocks tending to force both blocks tightly into said auxiliary recesses.

5. In a reamer construction, a reamer body having a main recess in its outer surface and a smaller auxiliary recess at each end of said main recess, each of said auxiliary recesses tapering toward a smaller dimension in a direction away from said main recess and in a direction outwardly from the center of said reamer body, a correspondingly tapered block in each of said auxiliary recesses, a reamer pin having its ends carried by said blocks respectively, and extending through said main recess, a reamer cutter rotatably carried by said pin within said main recess, and means for forcing both blocks tightly into said auxiliary recesses.

6. In a reamer construction, a reamer body having a main recess in its outer surface and a smaller auxiliary recess at each end of said main recess, each of said auxiliary recesses tapering toward a smaller dimension in a direction away from said main recess, a correspondingly tapered block in each of said auxiliary recesses, a reamer pin having its ends carried by said blocks respectively, and extending through said main recess, a reamer cutter rotatably carried by said pin within said main recess, and means for forcing both blocks tightly into said auxiliary recesses.

7. In a reamer construction, a reamer body having a main recess in its outer surface and a smaller auxiliary recess at each end of said main recess, each of said auxiliary recesses tapering toward a smaller dimension in a direction away from said main recess, a correspondingly tapered block in each of said auxiliary recesses, a bearing means carried by one of said blocks and projecting into said main recess, a reamer cutter rotatably carried by said bearing means within said main recess, and means for forcing both blocks tightly into said auxiliary recesses.

8. In a reamer construction, a reamer body having a main recess in its outer surface, and a smaller auxiliary recess at one end of said main recess, said auxiliary recess tapering toward a smaller width in a direction away from said main recess, a correspondingly tapered block in said auxiliary recess, a bearing means carried by said block and projecting into said main recess, a reamer cutter rotatably carried by said bearing means within said main recess, and means for forcing said block tightly into said auxiliary recess.

GEORGE G. HARRINGTON.